March 8, 1966

M. F. PETERS 3,238,781

PRESSURE MEASURING DEVICES

Filed Oct. 30, 1963

INVENTOR.
MELVILLE F. PETERS
BY Albert F. Kornman
ATTORNEY

March 8, 1966 M. F. PETERS 3,238,781
PRESSURE MEASURING DEVICES
Filed Oct. 30, 1963 3 Sheets-Sheet 2

INVENTOR.
MELVILLE F. PETERS
BY
ATTORNEY

March 8, 1966 M. F. PETERS 3,238,781
PRESSURE MEASURING DEVICES

Filed Oct. 30, 1963 3 Sheets-Sheet 3

INVENTOR.
MELVILLE F. PETERS
BY
ATTORNEY

United States Patent Office 3,238,781
Patented Mar. 8, 1966

3,238,781
PRESSURE MEASURING DEVICES
Melville F. Peters, Livingston, N.J., assignor to
Joseph J. Mascuch, Millburn, N.J.
Filed Oct. 30, 1963, Ser. No. 320,023
11 Claims. (Cl. 73—384)

This invention relates to pressure measuring devices which measure the ambient atmospheric or hydraulic pressure and particularly to pressure measuring devices which are completely closed and permit no passage of fluid or gas between the ambient medium and the internal structure of the measuring instrument.

Certain pressure measuring devices such as hypsometers measure ambient pressure by noting the boiling point of a substance subjected to the ambient pressure which is to be measured. So far as is known, all prior devices of this nature have been open to the surrounding atmosphere and, because of this fact, some of the liquid within the hypsometer escapes and must be replenished from time to time. This disadvantage is not serious when the hypsometers are used to measure atmospheric pressure in an airplane or rocket. However, such devices cannot be used to measure the pressure of liquids, particularly very high pressures, below the surface of the ocean or fluids in a line which must operate without contamination by the fluids escaping from the hypsometer.

The pressure measuring devices described and claimed herein are all closed to the ambient fluid and because of this fact can be used indefinitely without recharging or contamination from the surrounding fluid. Some of the instruments described herein require a heating current to vaporize the liquid while others use the energy delivered by radioactive material for heating and vaporizing the contained fluid.

An object of the present invention is to provide an improved hypsometer or pressure measuring device which avoids one or more of the disadvantages and limitations of prior art arrangements.

Another object of the present invention is to measure pressure by means of an instrument which does not depend primarily on the deformation of a solid element.

Another object of the present invention is to provide an enclosed system for measuring pressure which can be used indefinitely without the loss or contamination of any liquid from within the instrument.

Another object of the present invention is to measure ambient pressures by means of noting the boiling point of an enclosed liquid.

Another object of the present invention is to use a hypsometer-like instrument for the measurement of very high pressures such as those encountered far below the surface of the ocean.

Another object of the present invention is to greatly extend the operating life of a pressure measuring device by employing radioactive material as the heat source.

The invention comprises a closed envelope which is terminated at one of its ends by a flexible bellows. A quantity of liquid is carried within the envelope which is provided with means for heating the liquid to its boiling point. A temperature measuring element such as a thermometer, a thermo-couple, or a thermistor is mounted so as to be substantially in direct contact with the vapors from the boiling liquid, in accordance with known hypsometer practices. Condensation means is provided for condensing the vapor and directing the condensate to a storage space where it can again be heated to provide an inexhaustable source of vapor.

A feature of the present invention includes the use of radioactive material which provides enough heat to vaporize the contained liquid. This type of instrument requires no applied electrical power.

Another feature of the present invention is to confine the bellows movement to a small interval about its free length so that the pressure differential across the bellows at all times will be negligible.

A further feature of the present invention is the use of a bellows responsive to ambient pressure for controlling fluid supply within the pressure measuring device.

The invention consists of the construction, combination and arrangement of parts, as herein illustrated, described and claimed.

In the accompanying drawings, forming a part hereof are illustrated several forms of embodiment of the invention, in which drawings similar reference characters designate corresponding parts, and in which.

Figure 1:
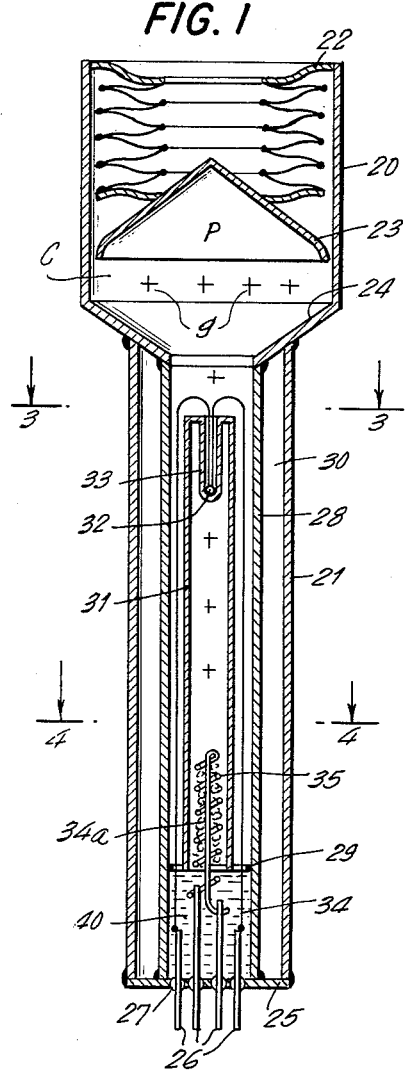
FIGURE 1 is a cross-sectional view of a pressure measuring device made in accordance with the present invention.
Figure 2:
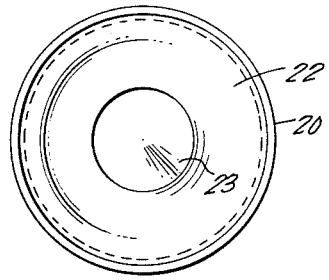
FIGURE 2 is a top plan view of the instrument shown in FIGURE 1.
Figure 3:
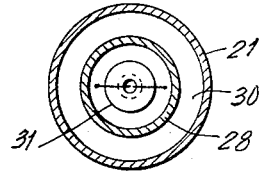
FIGURE 3 is a cross-sectional view of the device shown in FIGURE 1 and is taken along line 3—3 of that figure.
Figure 4:
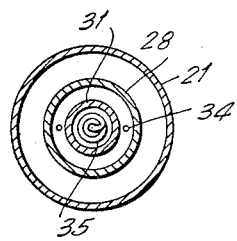
FIGURE 4 is a cross-sectional view of the pressure measuring device shown in FIGURE 1 and is taken along line 4—4 of that figure.
Figure 6:
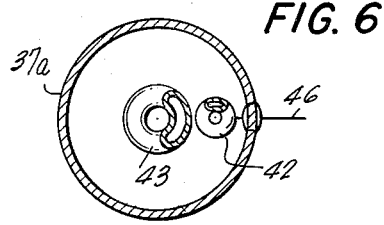
FIGURE 6 is a cross-sectional view of the instrument shown in FIGURE 5 and is taken along 6—6 of that figure.

Referring now to the drawings and particularly to FIGURES 1, 2, 3 and 4; 20 indicates an upper cylindrical container having a lower smaller cylinder 21 secured thereto. The upper end of cylinder 20 is closed by a high pressure flexible bellows 22 which is secured to the edges of the cylinder by welding. The lower portion of this bellows 22 is secured to a conical cap 23. The cap 23, as hereinafter more fully set forth aids in trapping condensed vapors and directs the condensed drops to the periphery of the cap. The condensate then drops onto an inclined conical portion 24 between the cylinders 20, 21, and then proceeds to a lower condensing surface. The lower cylinder 21 is closed at its lower end by a flat disc 25. Since the instrument requires both a heating current for vaporizing the liquid and a pair of connectors for measuring the temperature by means of a thermo-couple or a thermistor, four lead-in conductors 26 are provided through insulated beads 27 secured in the base disc 25.

Within cylinder 21 is another cylinder 28 spaced therefrom and in axial alignment for providing thermal insulation for the active components. Cylinder 28 is welded at one end to the disc 25 and at its opposite end to the cone portion 24 so that an annular thermally insulating space 30 is provided between cylinders 21, 28. This annular space is evacuated through any convenient conduit (not shown) and the vacuum thus produced shields the internal structure from external sources of heat. Within cylinder 28 a third supporting cylinder 31 is secured by affixing it at its lower end to a spider 29. This spider may be in the form of a disc having holes therein for the passage of electrical conductors and fluid. A quantity of some suitable fluid 40 is carried within the cylinder 28. At the upper end of cylinder 31, a temperature-responsive component 32 is secured. As shown in the drawing, this component 32 is either a thermistor or a thermo-couple. Component 32 may be enclosed in a well 33. Wires leading to the component 32 pass up through the well space and then down between the cylinders 32 and 28 to the lead-in conductors 26. It is obvious that electrical connections can be made at other portions of the instrument container and the design is not limited to any position for making the electrical connections. A wick 34a is carried within the cylinder 31. One end of the wick 34a is in contact with the liquid 40 in the reservoir 34 and the opposite end extends into the cylinder 31.

The chamber C is filled at a pressure P with a gas g. The preferred pressure P is the average operating pressure and is measured when bellows 22 is at its free length.

The operation of this instrument is as follows: The ambient pressure bears against the flexible bellows 22 and positions cap 23 accordingly. The movement of the cap 23 changes the pressure within the sealed container thereby altering the boiling point of the liquid 40 in reservoir 34 at the bottom of the cylinder 28. Some of this liquid 40 is heated by a heater coil 35 around the wick 34a in the cylinder 28 and vaporized. The vapor moves up into contact with the temperature-sensitive device 32 and eventually cools and condenses on the inside surface of cylinder 31, running back to reservoir 34 to replenish the fluid supply. In a short time the temperature-sensitive component 32 reaches the same temperature as the boiling vapor given off by the liquid in reservoir 34. A measurement of this temperature establishes the pressure inside the instrument. The ambient pressure can also be computed since the pressure inside the inner cylinders is equal to the pressure on the outside of the cylinders plus the force necessary to extend the bellows to a distance which will bring the bellows array into balance with the difference in pressure. Since the bellows is operated near its free length the latter force is small.

Figure 5:
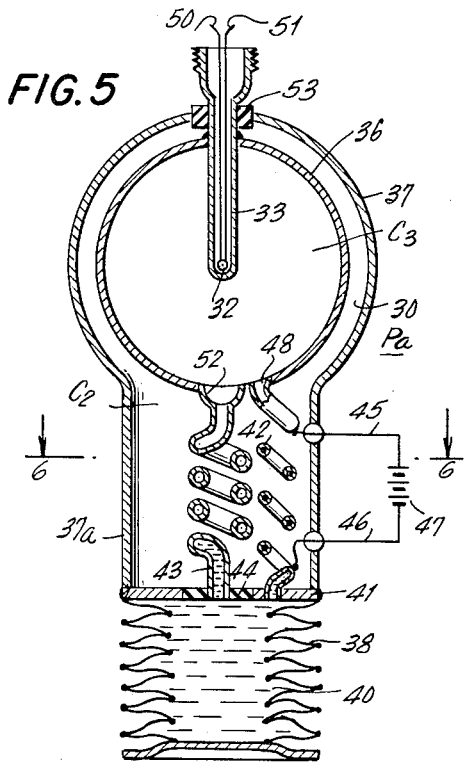
FIGURE 5 is another type of pressure measuring device according to the present invention showing a flexible bellows at the base of the instrument and using a helical conduit as a heater element.

A further embodiment of the invention is shown in FIGURE 5 where substantially the same elements are employed as were described in connection with FIGURES 1–4. In this alternate arrangement a temperature-sensitive element 32 is positioned within a well 33 which is welded to an inner spherical container 36 serving the same purpose as cylinder 28 in FIGURE 1. In this alternate design a container having a cylindrical bottom portion 37a and a substantially spherical upper part 37 surrounds container 36 and provides an annular space 30 which may be evacuated for thermal insulation.

The instrument shown in FIGURE 5 includes a nesting type bellows 38 positioned at the bottom of the instrument and containing a liquid 40. The bellows 38 is quite flexible and is easily moved by changes in the ambient pressure. The bottom portion 37a of the container is provided with a disc 41 which supports one end of a vaporizer in the form of a capillary tube 42. The tube is made of an electrically conductive material and is also a heater.

A return conduit 43 is held at one end by the disc 41 within an insulator insert 44 which may be ceramic. The capillary tube 42 is formed in a spiral to conserve space and its upper end communicates with the interior of sphere 36. Portions of this helix are used as a heater and electrical conductors 45 and 46 connect to a source of electrical power 47 for sending current through the helical tube 42 and for vaporizing any liquid which may be in the lower part thereof. The vapors generated by this heat escape through the upper end 48 of the conduit and heat the temperature-sensitive element 32 to the boiling point of the liquid at that pressure. The temperature-sensitive component 32 is connected to lead-in conductors 50, 51. These conductors may be connected to a bridge circuit (not shown) or any other type of measuring circuit which determines the temperature of component 32. The pressure within the sphere 36 is a function of this resistance or potential and therefore the ambient pressure can be determined at once. The vapors within the sphere 36 condense on the walls and run down to the bottom portion of the sphere, entering opening 52 and then running down through return conduit 43 to the reservoir 40 within the bellows.

If the pressure within the sphere 36 drops due to vapor condensation, the ambient pressure will compress the bellows 38 forcing a small quantity of fluid 40 into the capillary tube 42 which will thereupon vaporize to replenish the vapor in the sphere 36.

It should be noted that the circuit from the source of electrical power 47 to the tube 42 is subject to several short circuiting paths unless adequate insulation is provided. Insulator 44 in base disc 41 insures that current cannot be bypassed through conduit 43 and insulator 53 which surrounds the re-entrant well portion 33 insures that current cannot pass through the outside container 37 to bypass the heater. Insulators 44 and 53 may be made of ceramic material.

Since chamber $C_2$ in the preferred construction is evacuated and the pressure in chamber $C_3$ may be negligible when the heating coil 42 is not conducting the heating current, a high ambient pressure $Pa$ will produce a pressure differential of $Pa$ across casing 37, 37a and bellows 38. When $Pa$ is great, the walls 37, 37a must be strong and bellows 38 must nest to withstand the high pressure.

Figure 7:
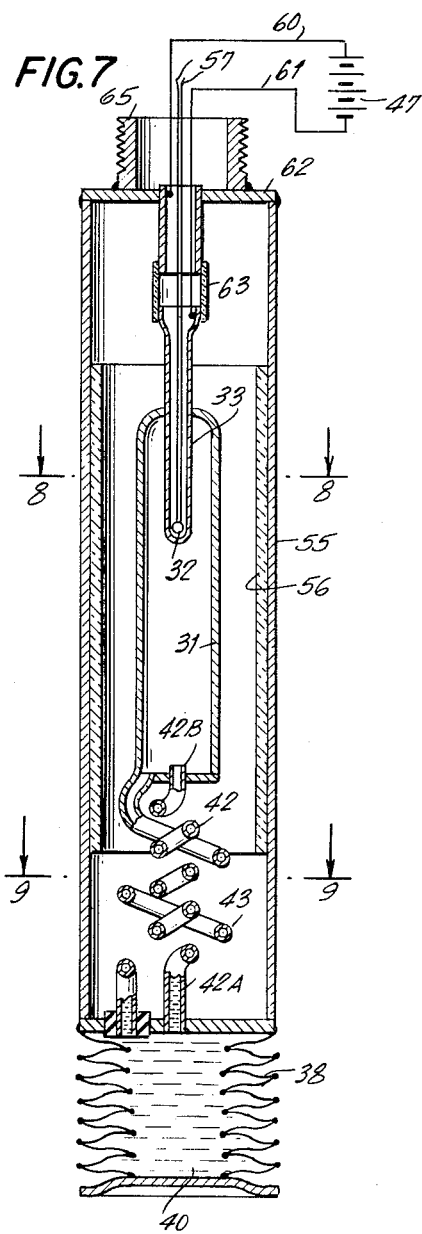
FIGURE 7 is a cross-sectional view of another form of a pressure measuring device showing bellows on the bottom and with all the electrical connections entering the top portion. This instrument also uses a helical conduit as the heating means.
Figure 8:
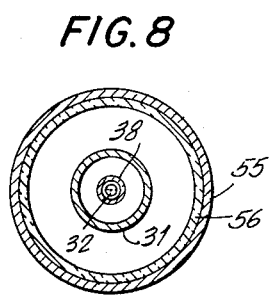
FIGURE 8 is a cross-sectional view of the instrument shown in FIGURE 7 and is taken along line 8—8 of that figure.
Figure 9:
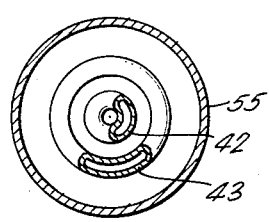
FIGURE 9 is another cross-sectional view of the instrument shown in FIGURE 7 and is taken along line 9—9 of that figure.

Referring now to the alternate design shown in FIGURES 7, 8 and 9, the pressure measuring device includes substantially the same operating components disclosed in the other arrangements. These essential parts include a helical capillary tube 42, a return conduit 43, bellows 38, providing a liquid reservoir 40 and a temperature-sensitive component 32 in a well 33. In this design the outside cylinder 55 is lined on its inner surface with a cylinder of heat insulating material 56 which serves the same purpose as the above described vacuum space 30. The temperature-sensitive conductors 57 are brought in from the upper portion of the instrument and conductors 60 and 61 carrying current from a source of potential 47 also enter through the same conduit. One of these conductors 60 is secured to the outside cylinder 55 and thereby makes electrical contact with the lower end 42A of the heater helix. The other conductor 61 is secured to the well portion 33 which is separated from the upper cap 62 by a glass or ceramic insulating cylinder 63. The current from conductor 61 passes through the upper portion of well 33, then down the conductive walls of condensing cylinder 31 to the upper portion 43B of helix 42. In this manner all the conductive leads may be brought out through an upper fitting 65 which is not in contact with the liquid in reservoir 38 and may be hermetically sealed by the usual nut and washer arrangements well-known in the art.

Figure 10:
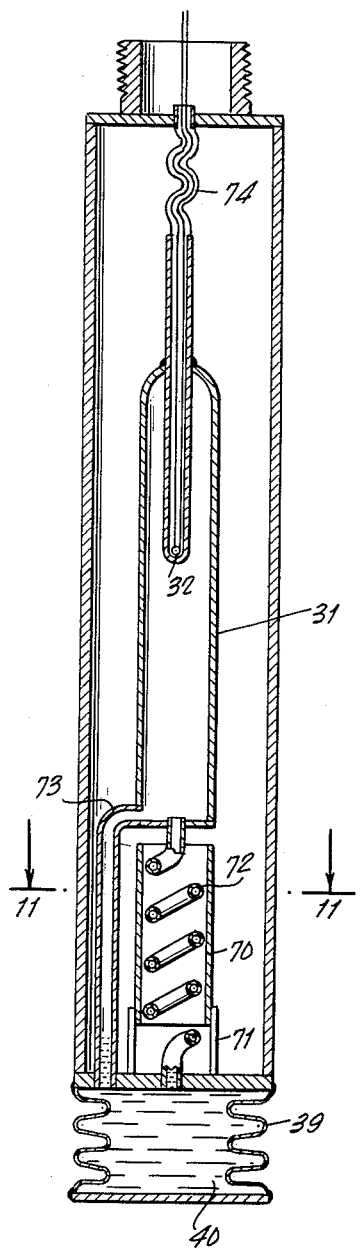
FIGURE 10 is a cross-sectional view of a device similar to the one shown in FIGURES 5 and 7, but employing a radioactive material as the heating means.
Figure 11:
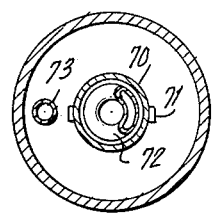
FIGURE 11 is a cross-sectional view of the instrument shown in FIGURE 10 and is taken along line 11—11 of that figure.
Figure 12:
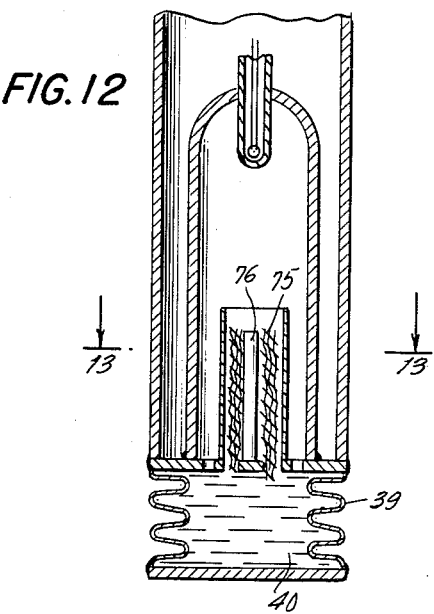
FIGURE 12 is a partial cross-sectional view of another form of a pressure measuring device according to the present invention employing radioactive material and a wick.

The alternate designs shown in FIGURES 10, 11 and 12, are similar to the previously described arrangements except that the heat necessary for vaporizing the liquid in reservoir 40 is furnished by a radio-active material. In the embodiment shown in FIGURE 10, the radio-active material is mixed with a binder and formed into a cylinder 70. This cylinder is mounted on legs 71 and surrounds the helical conduit 72 which communicates with the liquid 40 in the bellows shaped reservoir 39. The heat generated by this material causes the liquid forced into the helical conduit by ambient pressure on the bellows to vaporize, fill the cylinder 31, and raise the temperature of the temperature-sensitive component 32. When the vapor condenses, it runs down the sides of cylinder 31 and into return conduit 73. In order to conserve heat emitted by the radio-active material, the leads from the temperature-sensitive component may be supported by a capillary tubing 74 which may be formed in a helix to extend its length within a short distance and thereby reduce the outward heat flow.

Figure 13:
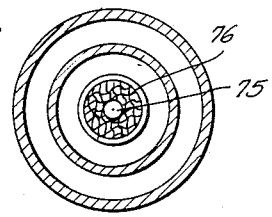
FIGURE 13 is a cross-sectional view of the instrument shown in FIGURE 12 and is taken along line 13—13 of that figure.

The alternate design shown in FIGURES 12 and 13, are similar to FIGURES 10 and 11, except that a wick 75 is provided on the outside of a cylinder 76. The radio-active material is included in the central cylinder 76 and the wick 75 raises the liquid from the reservoir to a position where it may be boiled off by the radio-active core.

Since the heat needed to vaporize liquid 40 is usually within the range 0.5 to 1.0 watt, the quantity of isotope required to supply this energy is small.

Having thus fully described the invention, what is claimed as new and desired to be secured by Letters Patent of the United States, is:

1. A pressure measuring apparatus comprising, a closed container, a resilient ambient pressure responsive bellows connected to said container and forming a portion of the container wall, a supply of liquid in the container, a heater in intimate contact with said liquid for heating it to its boiling point to produce a vapor therefrom, a temperature-responsive element within the container and positioned so as to be in contact with the vapor emitted by the liquid, and means connected to said temperature responsive element for measuring the vapor temperature within the container.

2. A pressure measuring apparatus comprising, a closed container, a resilient bellows connected to said container and forming a portion of the container well, a supply of liquid in the container, a wick having one end thereof immersed in the liquid and the other end extending into the container space, a heater in intimate contact with the wick for heating the liquid therein to its boiling point and for emitting a vapor therefrom, a temperature responsive element within the container, said element enclosed within a protective well above the wick, and measuring means connected to said element for measuring the vapor temperature within the container.

3. A pressure measuring apparatus comprising, a closed container of generally cylindrical shape mounted with its longitudinal axis in a vertical position, a resilient bellows connected to one end of the cylinder and adapted to vary its internal volume in response to changes in the ambient pressure, a supply of liquid in the container, a heater in intimate contact with the liquid for heating it to its boiling point and emitting a vapor therefrom, a temperature-responsive element within the container and positioned so as to be in contact with the vapor emitted by the liquid, and means connected to said element for measuring the vapor temperature within the container.

4. A pressure measuring apparatus as claimed in claim 3, wherein said heater is a resistance element and is connected to an external source of electrical power.

5. A pressure measuring apparatus as claimed in claim 3, wherein said heater is made of a radioactive material.

6. A pressure measuring apparatus as claimed in claim 3, wherein said heater comprises a conduit made of electrically resistive material.

7. A pressure measuring apparatus comprising, a first closed container of generally cylindrical shape mounted with the cylinder axis in a vertical position, a resilient bellows connected to one of the cylinder ends and adapted to vary its internal volume with changes in ambient pressure, a supply of liquid in the bottom of the container, a second cylindrical container mounted within the first, a heater in intimate contact with the liquid for heating it to its boiling point and emitting a vapor which is directed into the said second cylinder where it condenses on the walls thereof for subsequent return to the liquid supply, a temperature-responsive element mounted in said second cylinder and positioned so as to be in contact with the vapor emitted by the liquid, and measuring means connected to said element for measuring the vapor temperature within the container.

8. A pressure measuring apparatus as claimed in claim 7, wherein an annular space is formed between said first and second cylinders, said space being evacuated for thermal insulation.

9. A pressure measuring apparatus as claimed in claim 7, wherein lead-in conductors are mounted in insulating media for connecting said temperature-responsive element to said measuring means external to the container.

10. A pressure measuring apparatus as claimed in claim 7, wherein said bellows is secured to the bottom of said container and forms a reservoir for the liquid.

11. A pressure measuring device according to claim 7 in which the first cylinder contains a quantity of gas under pressure in contact with the resilient bellows.

References Cited by the Examiner
UNITED STATES PATENTS 2,599,276   6/1952   Norman _____ 73—384
2,832,219   4/1958   Sapoff et al. _____ 73—384

LOUIS R. PRINCE, *Primary Examiner.*